United States Patent [19]

Dittrich

[11] Patent Number: 4,471,409

[45] Date of Patent: Sep. 11, 1984

[54] MICROCOMPUTER SECURITY ENCLOSURE

[75] Inventor: Clifford Dittrich, Centereach, N.Y.

[73] Assignee: Fifth Season Electronics, Ltd., Centereach, N.Y.

[21] Appl. No.: 447,496

[22] Filed: Dec. 6, 1982

[51] Int. Cl.³ ............ H02B 1/06

[52] U.S. Cl. ............ 361/429; 174/52 R; 220/19; 220/210; 248/51; 248/465.1; 361/380

[58] Field of Search ............ 361/380, 395, 399, 392, 361/394, 428; 174/50, 52 R; 248/51, 441 D, 551; 339/37, 39, 75 R, 75 PM, 82, 107; 312/196, 208; 70/57, 58, 59, 77, 78, 79, 159, 160; 220/19, 210

[56] References Cited

U.S. PATENT DOCUMENTS

| | | | |
|---|---|---|---|
| 3,895,768 | 7/1975 | Scheck | 248/553 |
| 4,063,637 | 12/1977 | Darforth | 70/59 |
| 4,123,922 | 11/1978 | Kuenstler | 70/58 |
| 4,170,334 | 10/1979 | Villanueva | 70/58 |
| 4,229,778 | 10/1980 | Williams et al. | 361/399 |
| 4,252,007 | 2/1981 | Kerley | 70/58 |
| 4,323,807 | 4/1982 | Sugiura | 312/284 |

*Primary Examiner*—A. D. Pellinen
*Assistant Examiner*—Gregory D. Thompson
*Attorney, Agent, or Firm*—Leonard Belkin

[57] ABSTRACT

A security enclosure of wirework construction to house a microcomputer and related equipment to permit normal use thereof but preventing access to its internal accessories and removal of its connecting cables. A base portion is attached to the work area and one or more upper portions are pivoted to close and lock the enclosure. The wirework construction is provided with bends to prevent removal of cable connectors and is placed to prevent access to the interior of the machine.

8 Claims, 11 Drawing Figures

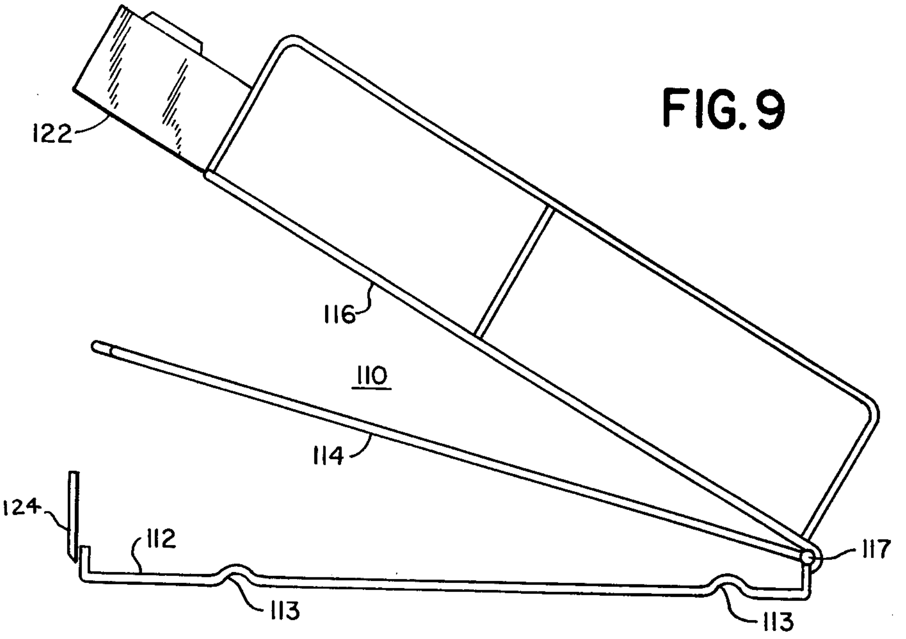
FIG. 9
FIG. 10
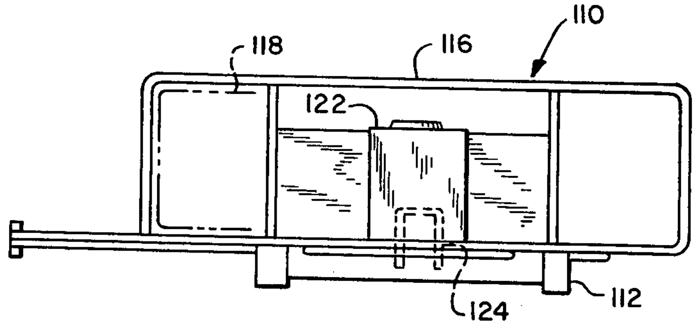
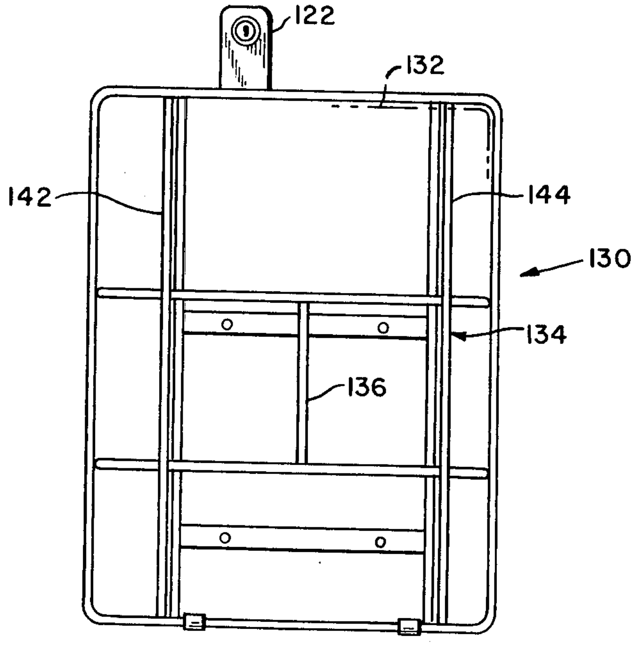
FIG. 11

MICROCOMPUTER SECURITY ENCLOSURE

BACKGROUND OF THE INVENTION

This invention relates to a microcomputer security enclosure and more particularly to an enclosure which permits normal use of the computer, while at the same time prevents the removal of cartridges, modules and components from within the computer and cables, and joy sticks, paddles and other attachments which are plugged into the computer.

The small, table top computer is appearing in large numbers in homes, offices, retail establishments, and other places of business and recreation. Because of the portability, it is considered important by most users to secure these devices against unauthorized removal, and ordinarily it is no problem to attach a microcomputer to its work space thereby preventing or inhibiting its removal except by persons having the authority to do so.

The problem posed by the ordinary security fastener is that the microcomputer is provided with a variety of accessories which of themselves can be quite valuable and so attractive as items to be removed. Included in this group are cartridges containing the programs, or software, which can be quite valuable, joy sticks, and cables which are plugged into the unit.

Hence, the mere attachment of a microcomupter to a work space will not secure such accessories. The use of an enclosure which is locked into place can be made to protect these items, but then the computer is not accessible for use. This produces problems associated with efficient use of the equipment. In many cases the conflicting goals are irreconcilable thereby making it necessary for the owner of the microcomputer to make a choice between security and accessibility for use on demand.

There have been attempts to deal with this particular problem. In U.S. Pat. No. 4,123,922, a receptacle is provided for desk calculators using lanyards to anchor the devices but permitting limited movement for its normal use. In U.S. Pat. No. 4,212,175 a cable lock device is provided for securing portable office equipment. In U.S. Pat. No. 4,252,007 there is provided an anchored housing into which the small computer is inserted for use. In none of the above mentioned patents does there appear to be provision for securing the interior accessories and exterior accessories such as joy stick and cables.

In U.S. Pat. No. 4,170,334, there is disclosed a housing for a smoke detector for permitting its use, but in this patent access to the interior of the detector is maintained so that batteries and the like can be replaced.

U.S. Pat. No. 4,323,807 does show a complete enclosure having openings to permit use of the electronic equipment within. This patent has no provision for attachment to outside accessories and the small openings in the enclosure limit its ability somewhat to use the equipment.

It is also noted that U.S. Pat. No. 4,063,637 shows a wire enclosure for a helmet, and presumably the purpose of this construction is to reduce weight and make it possible to view the helmet trapped within.

SUMMARY OF THE PRESENT INVENTION

The present invention overcomes the drawbacks of present security devices for portable computers and the like by providing a cage-like housing which permits full use of the device secured within while at the same time preventing access to its interior and blocking removal of the external accessories such as joy sticks and cables. In addition, the instant invention permits the device to be viewed in its entirety so that all of its identifiable features are exposed to view and the user, or prospective user, is not faced with a possible ambiguity as to which device he is operating or is about to operate.

In accordance with the principles of this invention there is disclosed a preferred embodiment which consists of a lower assembly of wirework construction for receiving the microcomputer, an upper assembly of wirework construction pivotally mounted on the lower assembly to permit removal or insertion of the computer when open and fully enclosing the computer when closed, and provision to lock the two assemblies together thereby preventing unauthorized removal of the computer. A critical feature of the wirework construction of both assemblies is that it is fashioned to prevent, when the assemblies are closed and locked, the removal of the external accessories such as joystick controllers and cables which are plugged in, and also prevent the removal of internal accessories by blocking the opening of covers on the computer which must be opened in order to remove or insert catridges and modules.

It is thus a principal object of this invention to provide a security enclosure for a microcomputer and the like which guards against the unauthorized removal of internal and external accessories but does not interfere with the normal use of the equipment.

Other objects and advantages of this invention will hereinafter become obvious from the following description of preferred embodiments of this invention.

BRIEF DESCRIPTION OF THE DRAWINGS

FIG. 9 is a front view of an alternative preferred embodiment of this invention for use with an interface.

FIG. 10 is a side view of the enclosure shown in FIG. 9.

FIG. 11 is a plan view of another embodiment of this invention for use with a disk drive.

DESCRIPTION OF THE PREFERRED EMBODIMENTS

Figure 1:
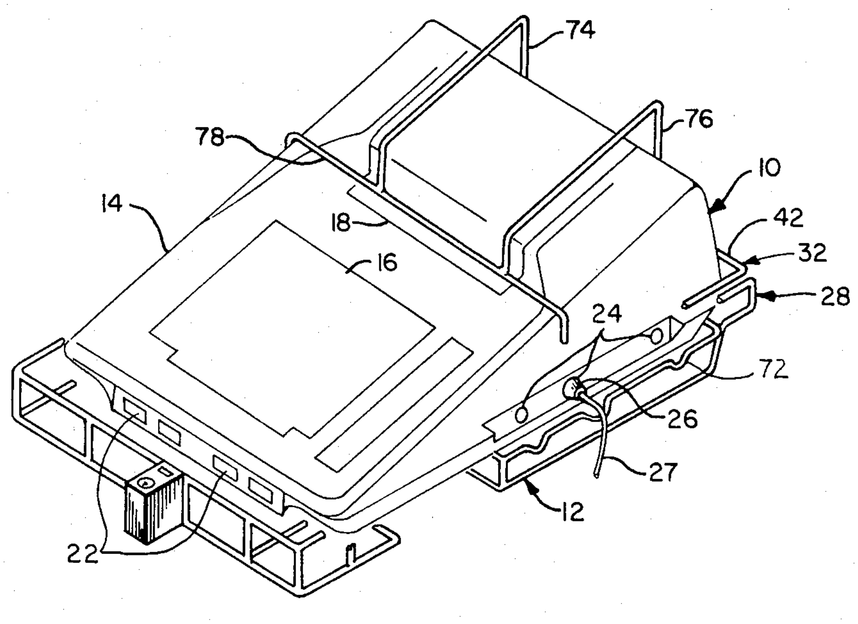
FIG. 1 is an isometric view of a microcomputer enclosed within security enclosure which is partially cut away, embodying the principles of this invention.
Figure 3:
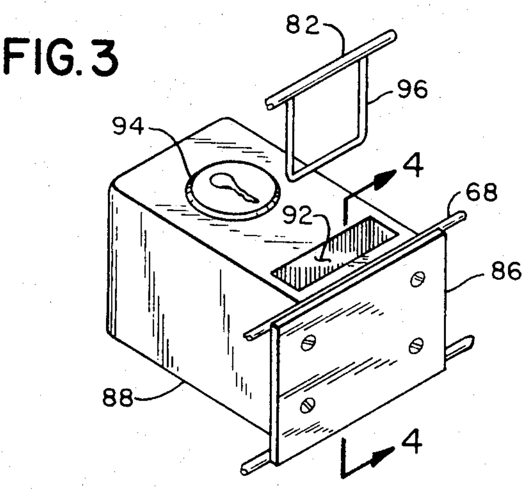
FIG. 3 is an isometric view of the lock assembly used in the enclosure of FIGS. 1 and 2.
Figure 4:
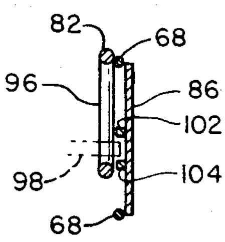
FIG. 4 is a view along 4—4 of FIG. 3.

Referring to FIG. 1, there is illustrated microcomputer 10 enclosed within a security enclosure 12 constructed in accordance with the principles of this invention.

Computer 10 consists of a housing 14 with a keyboard 16 and a cover 18 pivoted at the rear behind housing 14 and lifted from the front to permit removal and insertion of a cartridge and/or memory cards. On the front and sides, respectively, are provided receptacles 22 and 24 for the insertion of cable connectors, only one of which, connector 26 with cable 27 is shown by way of illustration.

For details of security enclosure 12 reference is made to FIGS. 2–8. It is seen that enclosure 12 is of wirework construction with the gauge of the wire used in its construction being sufficiently rigid as to prevent distortion without the use of tools.

Enclosure 12 is made up of a base or lower assembly or portion 28 and an upper assembly or portion 32. It will be seen that the latter is pivoted at the rear on the former using a pair of sleeves 34 and 36 for this purpose (see FIG. 7) mounted on horizontal wire members 38 and 42 which are part of base and upper portion 28 and 32, respectively.

Figure 5:
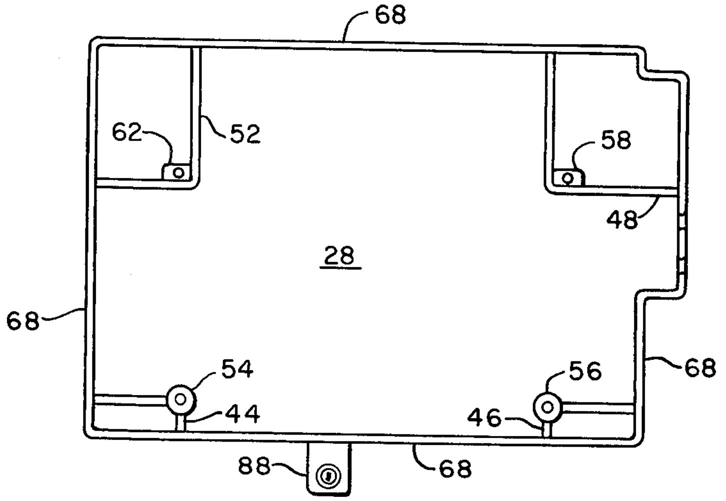
FIG. 5 is a plan view of the lower part of the enclosure shown in FIGS. 1 and 2.
Figure 6:
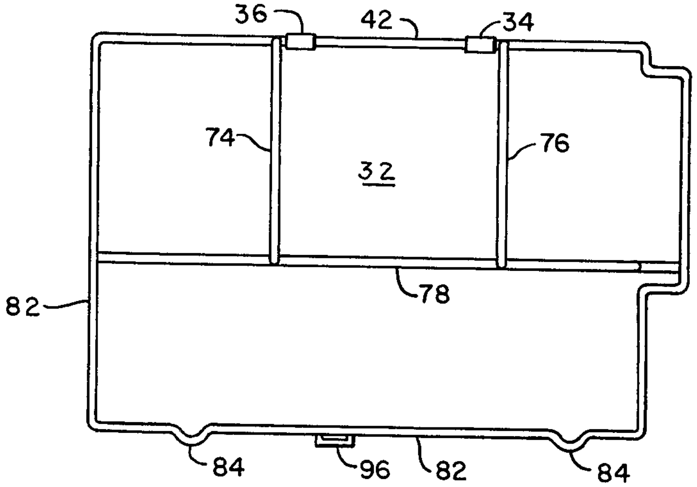
FIG. 6 is a plan view of the upper part of the enclosure shown in FIGS. 1 and 2.
Figure 7:
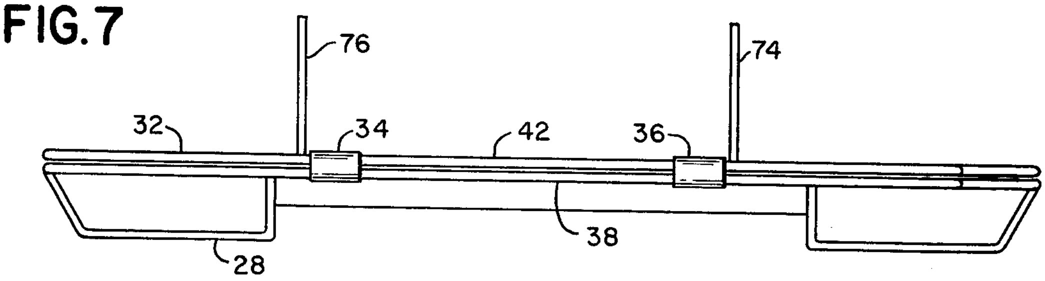
FIGS. 7 and 8 are rear and front views, respectively, of the enclosure shown in FIGS. 1 and 2.
Figure 8:
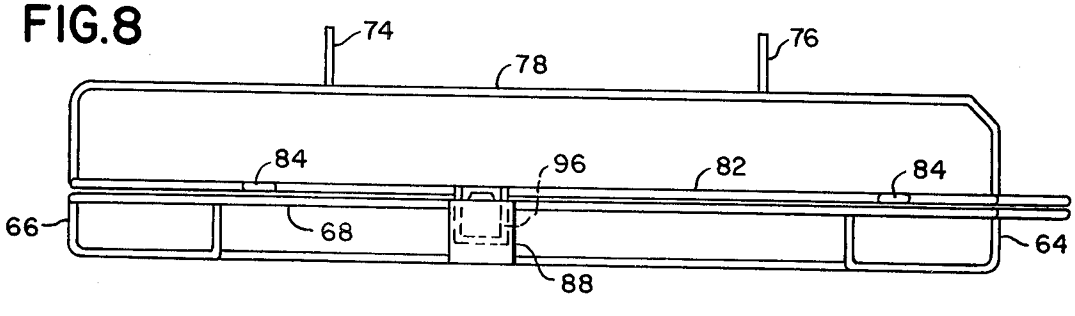

An seen in FIG. 5 with greater particularity, base portion 28 is provided at the four corners with rectangular shaped wire configurations 44, 46, 48 and 52 with flat mounting pads 54, 56, 58 and 62 having openings. With the use of screws (not shown) in the aforementioned pads, base portion 28 is attached to a work surface. It is seen that with computer 10 in enclosure 12 sealed as hereinafter described, it is impossible to gain access to the screws for their removal.

Figure 2:
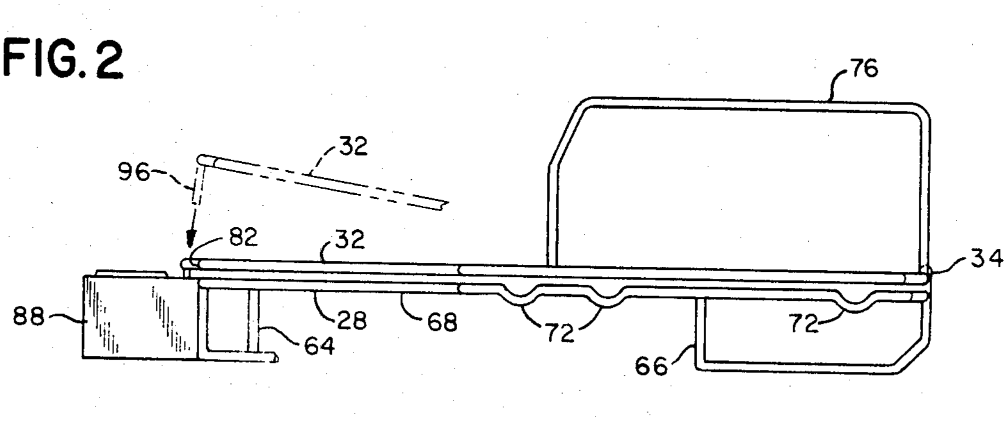
FIG. 2 is a right side view of the enclosure shown in FIG. 1.

Base portion 28 consists of wirework leg assemblies at the corners, as indicated by numerals 64 and 66 in FIG. 2, supporting a raised but horizontal wire 68 which surrounds computer 10 and includes wire members 38 at the rear. Wire 68 is provided with open loops or bends 72 which may be opposite or staggered from receptacles on computer 10, where cables are to be connected through a plug. The diameter of each loop is large enough to accommodate the cable, or more than one cable, when top portion 32 is in place as shown in FIG. 2 but not large enough to permit the removal of the plug at the end of a cable inserted in its receptacle. Upper portion 32, also of wirework construction, is generally shaped to conform to the configuration of computer 10. When in a closed position, as shown in FIGS. 1 and 2, a pair of wires 74 and 76 extending up from wire 42 in the rear, passing over cover 18 and terminating in a transversely extending wire 78 which is just above cover 18, preventing its being opened. Upper portion 32 also has a peripheral wire 82 including wire member 42 at the rear with open loops or bends 84 to accommodate cables as described above but not permit passage of the plugs in which the cables terminate. Loops or bends 84 are staggered with respect to receptacles 22 and each loop or bend 84 will accommodate, in this case, two cables. This staggered arrangement permits the user to plug or unplug a cable conveniently and also moves the cables extending from the front receptacles off to the side and out of the way.

It will be noted that with the construction just described the user of computer 10 has complete access to keyboard 16 so that the machine can be used with security enclosure 12 in place.

In order to lock upper portion 32 to base portion 28, the latter is provided with a vertical plate 86 attached by welding or other convenient means to the front thereof, and on plate 86 is mounted a lock assembly 88 provided with a rectangular entry 92 and a lock 94. Upper portion 32 is provided with a u-shaped wire 96 extending down from peripheral wire 82 and when enclosure 12 is closed, wire 96 extends into lock assembly 88 through entry 92. When the key (not shown) is inserted into lock 94 and is turned, lock bolt 98 (see FIG. 4) advances into the space within wire 96, thereby preventing the raising of upper portion 32. In order to insure that distortion of the various parts will not permit wire 96 from passing bolt 98 when in a locked position, a pair of bars or detents 102 and 104 welded or otherwise attached to plate 86 are provided.

In the use of the security enclosure just described, with top portion 32 raised, microcomputer 10 is inserted into base portion 28 which may be screwed to its work surface. Then the various cards, cables, and joy stick controllers are plugged into the receptacles located along the sides of computer 10, and upper portion is lowered into its closed position shown in FIG. 2. A key is inserted in lock 94 and the enclosure locked. Wire 82 of assembly 32 closes in effect bends 72 against plug removal and wire 68 of base assembly 28 closes off bends 84 in upper assembly 32. Computer 10 is ready for normal use. When it is necessary to replace a cartridge, for example, lock assembly 88 is unlocked with a key, top portion 32 raised so that cover 18 can be opened for the replacement of the cartridge.

It is understood that the details of the configurtion of enclosure 12 are designed for the particular computer with which it is to be used and in that sense the enclosure is tailor-made but the general design is as described hereinabove.

In all cases, however, there would be a base portion into which the unit goes, the cables are then attached, and at least one upper portion to be lowered and locked into place. Loops or bends or slots in the wires comprising the enclosure would be provided to accommodate the various cables and the upper portion would be provided with latticework where necessary to prevent access to the interior of the unit.

While in the preferred embodiment described above the enclosure has been shown in connection with a microcomputer, it should be understood that enclosures embodying the principles of this invention may be designed for use with accessories and peripheral equipment to be used with the computer, such as interface modules, disk drives, etc.

Some of such accessories, such as an interface modules, have a relatively large number of cables coming out from two, three, or four sides so that there is the additional problem of accommodating these cables without undue complexity. An arrangement for use with an interface module embodying the principles of this invention having such capability is shown in FIGS. 9 and 10 where it is seen that security enclsure 110 consists of three parts 112, 114, and 116 all pivoted together at a joint 117. In this arrangement, bottom part 112 would be attached to a work area, as described earlier, and and the intermediate part 114 would be pivoted down to contact bottom part 112. The interface module 118, shown only partially, in phantom, in FIG. 10, would then be placed on the intermediate part 114 and then upper part 116 would be lowered to enclose unit 118 and would be locked to bottom part 112 as described in connection with the embodiment of FIGS. 1–8. Lock assembly 122 is shown with the entry on the bottom for u-shaped member 124 extending up from bottom part 112.

With interface unit 110 located above the work surface it is seen that the cables (not shown) can be snaked around, under the unit and out of the way until they are sorted out to extend in the proper direction from the unit.

A feature of enclosure 110 illustrated in FIGS. 9 and 10 is its ability to be stacked on top of and interlock with another unit such as a disk drive. Referring to FIG. 11 there is illustrated a security enclosure 130 designed to accommodate a disk drive 132 whose exact shape and design is not a part of the invention, although enclosure 130 is sized and shaped to accommodate drive 132 in a similar fashion as enclosure 12 is sized and shaped to accommodate microcomputer 14 in FIGS. 1-8. However, in the arrangement shown in FIG. 11 it is seen that upper assembly 134 is provided with a member 136 which can be used to permit the bottom part 112 of enclosure 110 in FIGS. 9 and 10 to be looped under member 136 so that loops 113 in the bottom assembly 112 of enclosure 110 can rest on extended members 142 and 144 thereby interlocking enclosures 110 and 130, and permitting stacking of the units contained therein.

It is thus seen there has been provided a security enclosure for microcomputers and its accessory equipment which is effective in preventing unauthorized removal or access to the interior thereof while at the same time permitting full access for normal use.

In addition, the present arrangement is capable of preventing the unauthorized removal of cables while at the same time is sufficiently flexible to permit attaching cables to be arranged for the convenience of the user.

The various embodiments of the enclosure described herein utilize a wirework construction designed to provide the security desired while at the same time permitting access to the normal operation of the devices secured within. While the use of wires in the construction has been indicated, it is possible to substitute flat metal bars or a heavy plastic construction having the desired configuration to carry out the purposes of this invention.

While only certain preferred embodiments of this invention have been described it is thus understood that many additional variations thereof are possible without departing from the principles of this invention as recited in the appended claims.

What is claimed:

1. A security enclosure containing a microcomputer apperatus having externally connected cables and internally removable accessories comprising base assemply means of wirework construction attachable to a work area receiving said microcomputer apparatus, upper assembly means of wirework construction pivotally mounted on said base assembly means between a closed position fully enclosing said microcomputer apparatus and an open position permitting removal of said apparatus and any of the accessories thereof, and means for locking said pivotally mounted assembly means in its closed position against said base assembly means, the wirework construction of both said assembly means including guard means to prevent removal of cables with connectors at the ends thereof plugged into said apparatus and internal accessories of said microcomputer apparatus while at the same time exposing said apparatus effectively to full viewing and permitting normal control and operation thereof by a user, said guard means being effective only when said upper assembly means is closed and locked with said base assembly means.

2. The security enlosure of claim 1 having means in said guard means to prevent removal of cables during closed position including deformities in the wirework construction in at least one of said assembly means, said cables with connectors attached being removable when said enclosure is in its open position, said deformities blocking passage of connectors on said cables when said enclosure is in its closed position.

3. The security enclosure of claim 2 in which said deformities include bends in the wirework pg,13 construction of one of said assembly means adjacent the other assembly means when said assembly means are together during closure, said bends accommodating said cables but not the connectors thereof during closure, said bends permitting removal of cables with the connectors thereof when said security enclosure is in its open position.

4. The enclosure of claim 3 having an intermediate assembly means of wirework construction betwwen said base and upper assembly means to support said apparatus with a space beneath to accommodate said cables.

5. The enclosure of claim 4 having means to permit another enclosure of similar construction to be stacked thereon including means to interlock the stacked assemblies.

6. The enclosure of claim 3 in which said locking means includes a lock assembly attached to one of said assembly means and means on the other assembly means to engage said lock assembly when said enclosure is in its closed position, and means in said lock assembly to block opening of said enclosure by bending any part of said wirework construction of said assembly means.

7. The enclosure of claim 3 in which said wire construction includes flat metal bars.

8. The enclosure of calim 3 in which said wirework construction includes high strength plastic members.

* * * * *